US009697422B2

(12) United States Patent
Baba et al.

(10) Patent No.: US 9,697,422 B2
(45) Date of Patent: Jul. 4, 2017

(54) ELECTRONIC DEVICE, HANDWRITTEN DOCUMENT SEARCH METHOD AND STORAGE MEDIUM

(71) Applicant: KABUSHIKI KAISHA TOSHIBA, Minato-ku, Tokyo (JP)

(72) Inventors: Kunio Baba, Ome Tokyo (JP); Junichi Nagata, Tsurugashima Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/822,806

(22) Filed: Aug. 10, 2015

(65) Prior Publication Data

US 2015/0347835 A1 Dec. 3, 2015

Related U.S. Application Data

(63) Continuation of application No. PCT/JP2013/063063, filed on May 9, 2013.

(51) Int. Cl.

| | |
|---|---|
| ***G06K 9/00*** | (2006.01) |
| ***G06K 9/20*** | (2006.01) |
| ***G06K 9/18*** | (2006.01) |
| ***G06F 3/048*** | (2013.01) |
| ***G06K 9/62*** | (2006.01) |
| ***G06K 9/72*** | (2006.01) |
| ***G06F 17/30*** | (2006.01) |

(52) U.S. Cl.

CPC ......... *G06K 9/00442* (2013.01); *G06F 3/048* (2013.01); *G06F 17/30253* (2013.01); *G06K 9/00422* (2013.01); *G06K 9/18* (2013.01); *G06K 9/62* (2013.01); *G06K 9/72* (2013.01)

(58) Field of Classification Search

None

See application file for complete search history.

(56) References Cited

U.S. PATENT DOCUMENTS

2012/0251005 A1* 10/2012 Tonouchi ................ G06F 3/018 382/187

2014/0120981 A1* 5/2014 King ................ G06F 17/30265 455/556.1

FOREIGN PATENT DOCUMENTS

| | | |
|---|---|---|
| JP | 06-111073 | 4/1994 |
| JP | 06-150064 | 5/1994 |
| JP | 9-319504 | 12/1997 |
| JP | 2001-155115 | 6/2001 |
| JP | 2006-072639 | 3/2006 |

(Continued)

OTHER PUBLICATIONS

Machine translation of Naohiro et al. (WO2007/094078), 2007.*

(Continued)

*Primary Examiner* — Randolph I Chu

(74) *Attorney, Agent, or Firm* — Knobbe Martens Olson & Bear LLP

(57) ABSTRACT

According to one embodiment, an electronic device includes a stroke manager and a controller. The stroke manager is configured to store on a storage medium handwritten documents including stroke data items corresponding to strokes. The controller is configured to acquire a result of a search. The search includes least one of a character-string search and a handwriting search. The search is based on a value associated with an aspect ratio of a first stroke group.

19 Claims, 12 Drawing Sheets

(56) References Cited

FOREIGN PATENT DOCUMENTS

WO WO 2007/094078 8/2007

OTHER PUBLICATIONS

Machine translation of Hirofumi (JP 2006-072639), 2006.*

English Translation of International Preliminary Report on Patentability issued by The International Bureau of WIPO on Nov. 10, 2015 in the corresponding PCT Application No. PCT/JP2013/063063—7 pages.

International Search Report for International Application No. PCT/JP2013/063063, mailed Jun. 11, 2013, in 4 pages.

* cited by examiner

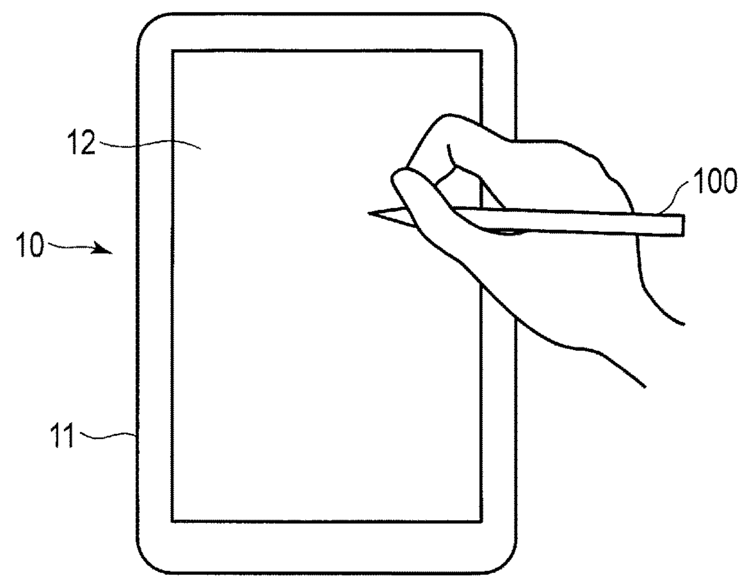
F I G. 1
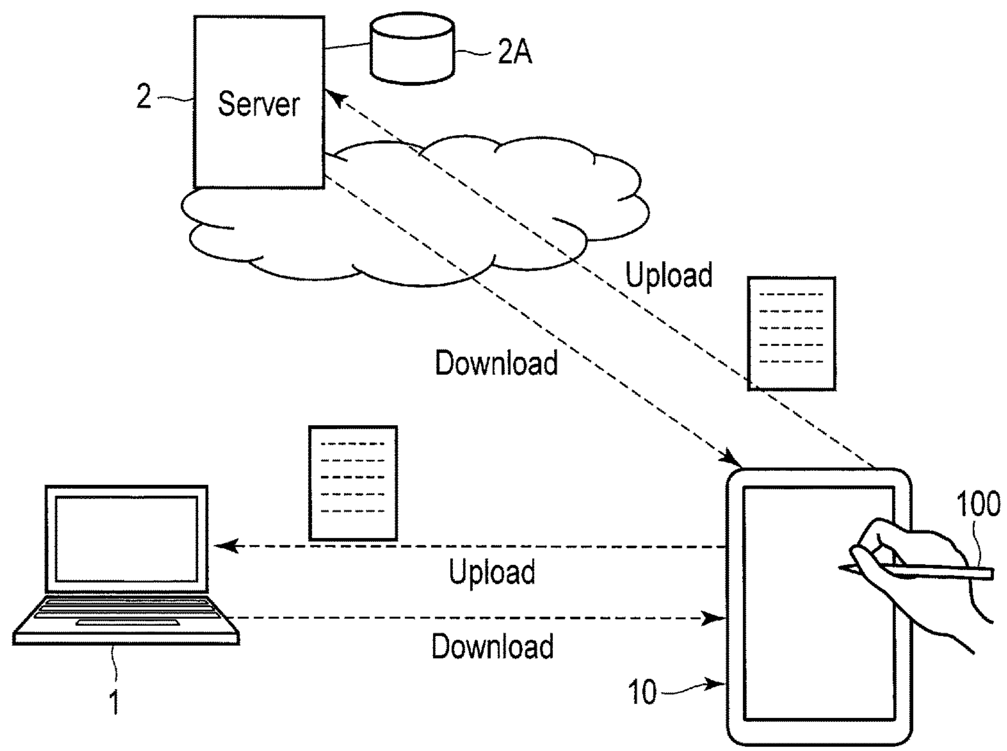
F I G. 2

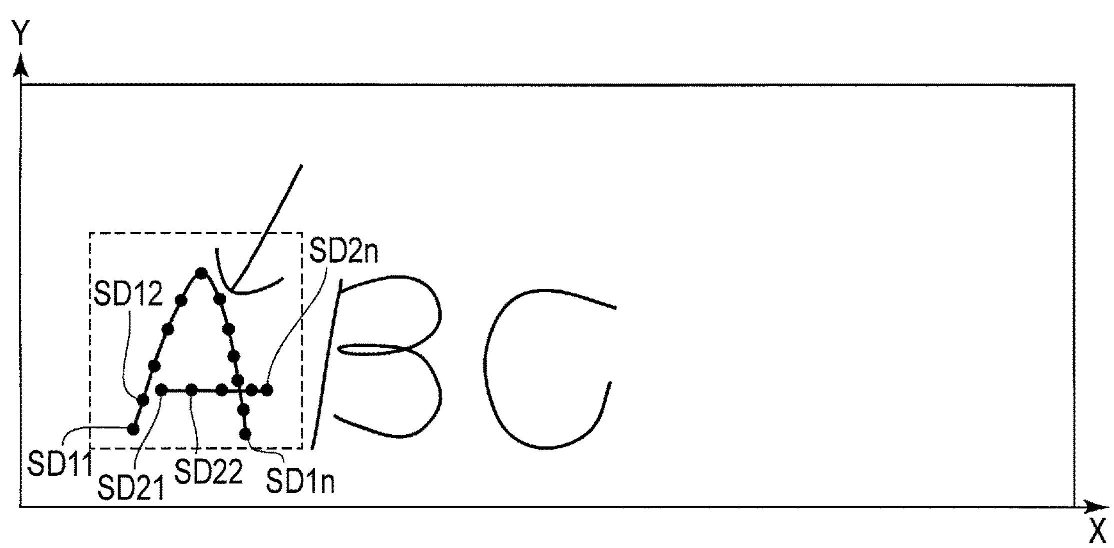
F I G. 3

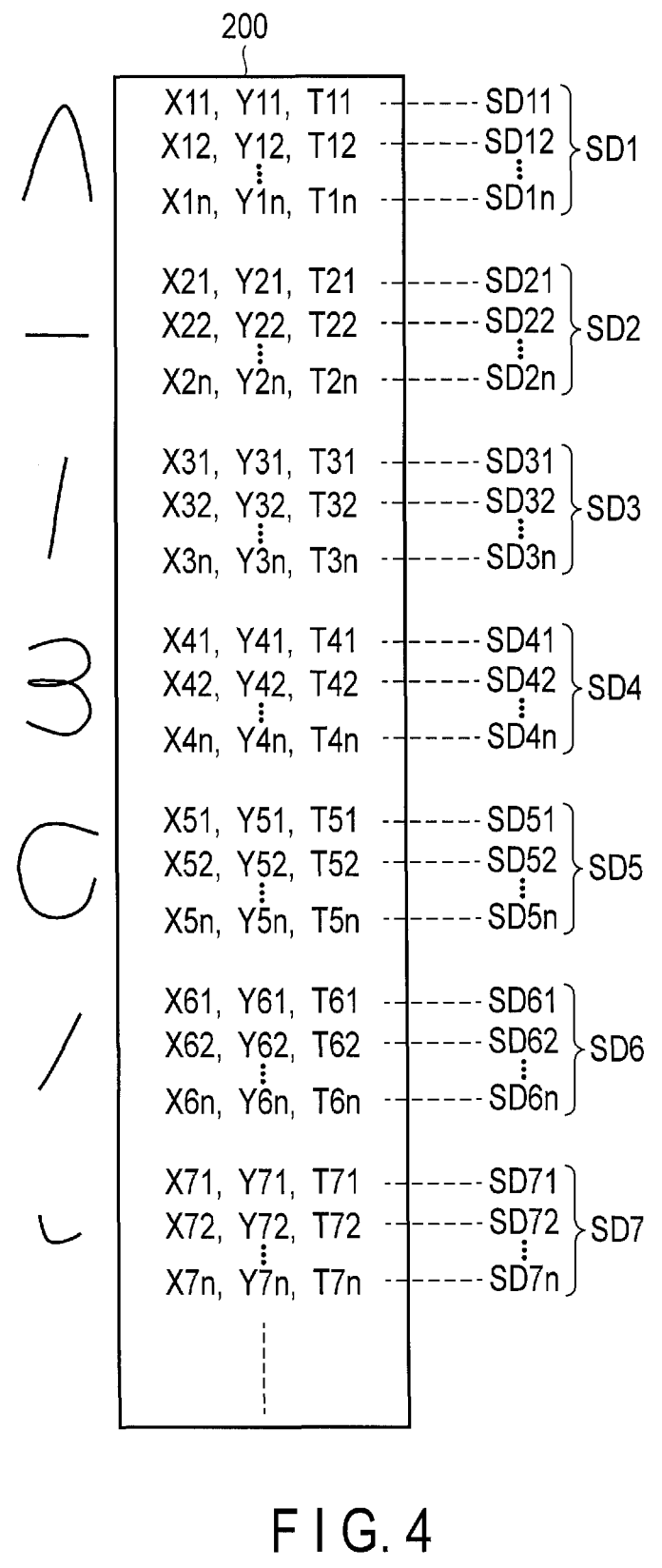

200

X11, Y11, T11 SD11
X12, Y12, T12 SD12
X1n, Y1n, T1n SD1n
SD1

X21, Y21, T21 SD21
X22, Y22, T22 SD22
X2n, Y2n, T2n SD2n
SD2

X31, Y31, T31 SD31
X32, Y32, T32 SD32
X3n, Y3n, T3n SD3n
SD3

X41, Y41, T41 SD41
X42, Y42, T42 SD42
X4n, Y4n, T4n SD4n
SD4

X51, Y51, T51 SD51
X52, Y52, T52 SD52
X5n, Y5n, T5n SD5n
SD5

X61, Y61, T61 SD61
X62, Y62, T62 SD62
X6n, Y6n, T6n SD6n
SD6

X71, Y71, T71 SD71
X72, Y72, T72 SD72
X7n, Y7n, T7n SD7n
SD7

F I G. 4

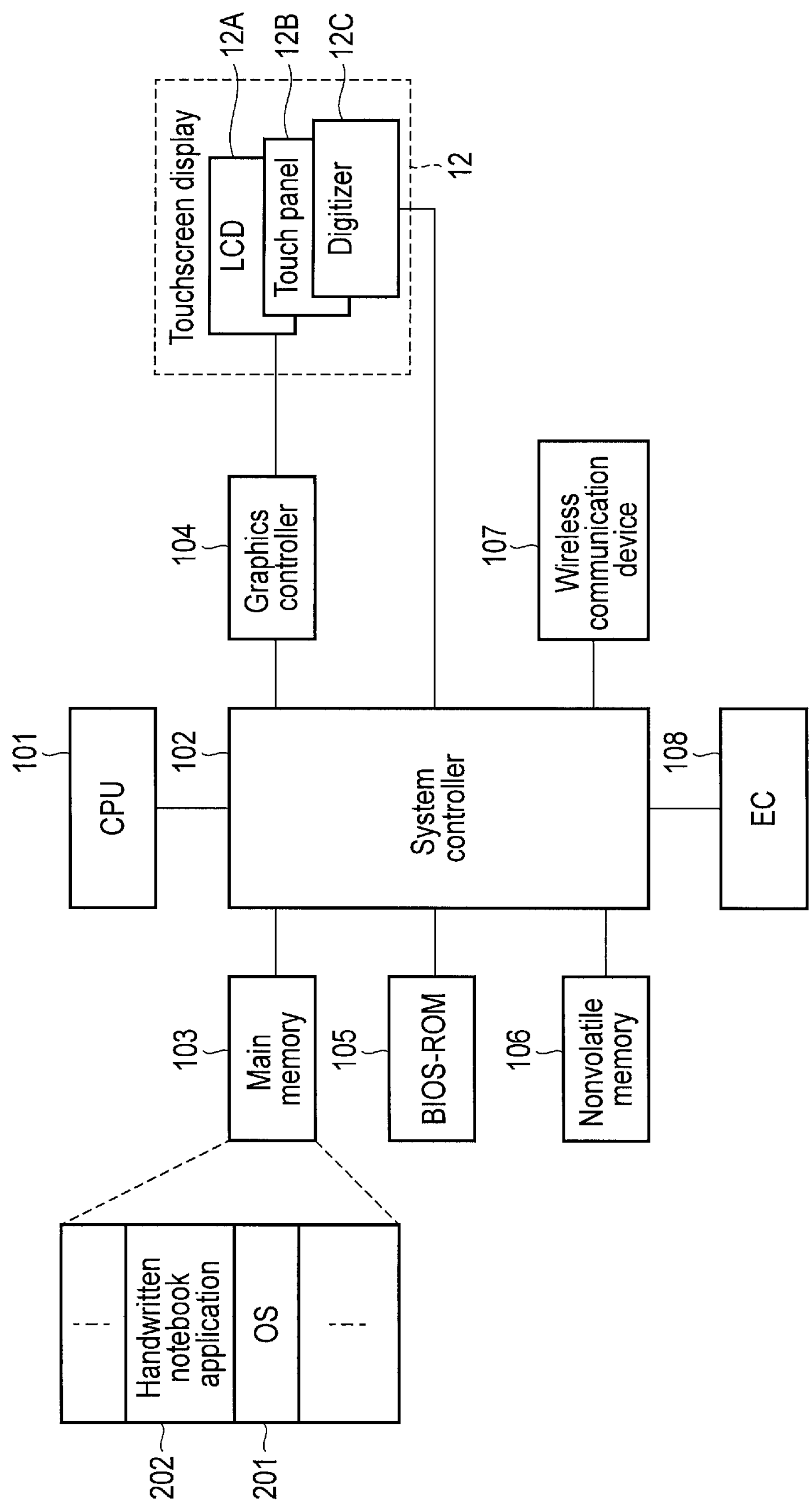
F I G. 5

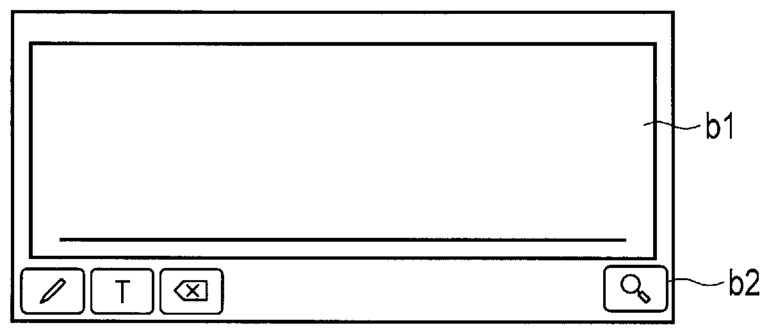
F I G. 7

| Page ID | User ID | Stroke 1 | | Stroke 2 | | ... |
|---|---|---|---|---|---|---|
| | | Stroke ID | Stroke data | Stroke ID | Stroke data | ... |
| 0001 | 0001 | 0001 | (X11, Y11), (X12, Y12), ... | 0002 | (X21, Y21), (X22, Y22), ... | ... |
| ⋮ | ⋮ | ⋮ | ⋮ | ⋮ | ⋮ | ⋮ |

411

F I G. 9

| Page ID | Stroke ID | Feature amount |
|---|---|---|
| 0001 | 0001 | xxx |
| 0001 | 0002 | yyy |
| ⋮ | ⋮ | ⋮ |

| Page ID | Stroke ID range | Character string |
|---|---|---|
| 0001 | 0001-0008 | XXXX |
| 0011 | 0081-0088 | YYYY |
| ⋮ | ⋮ | ⋮ |

FIG. 11

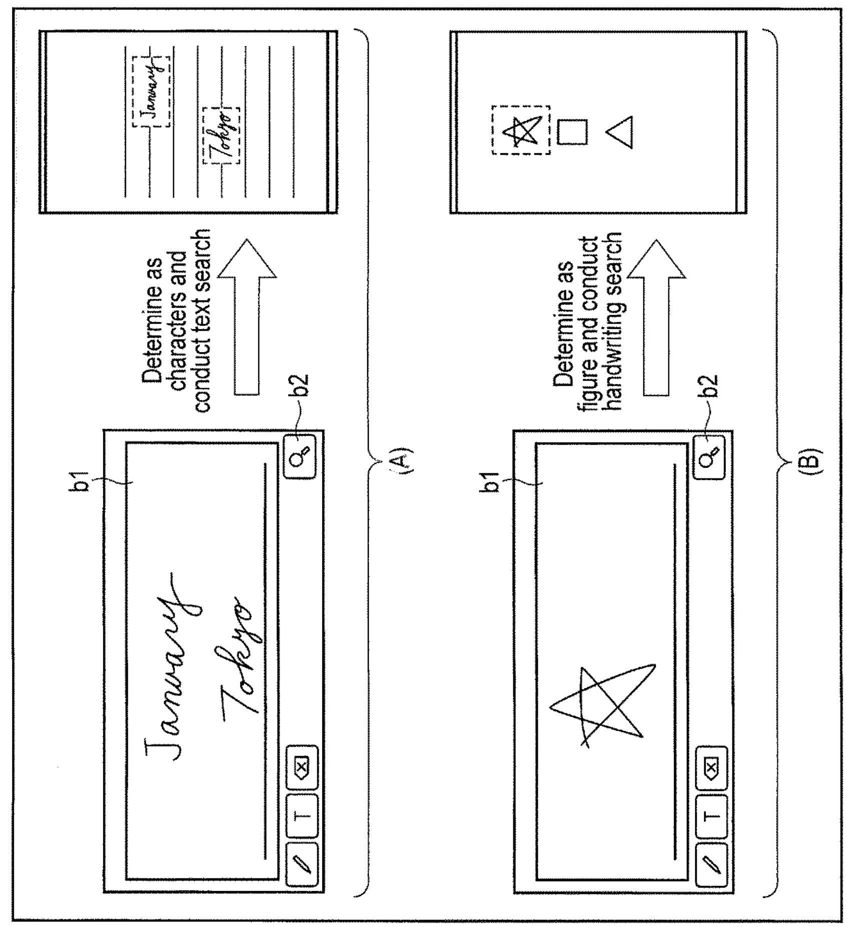
F I G. 14

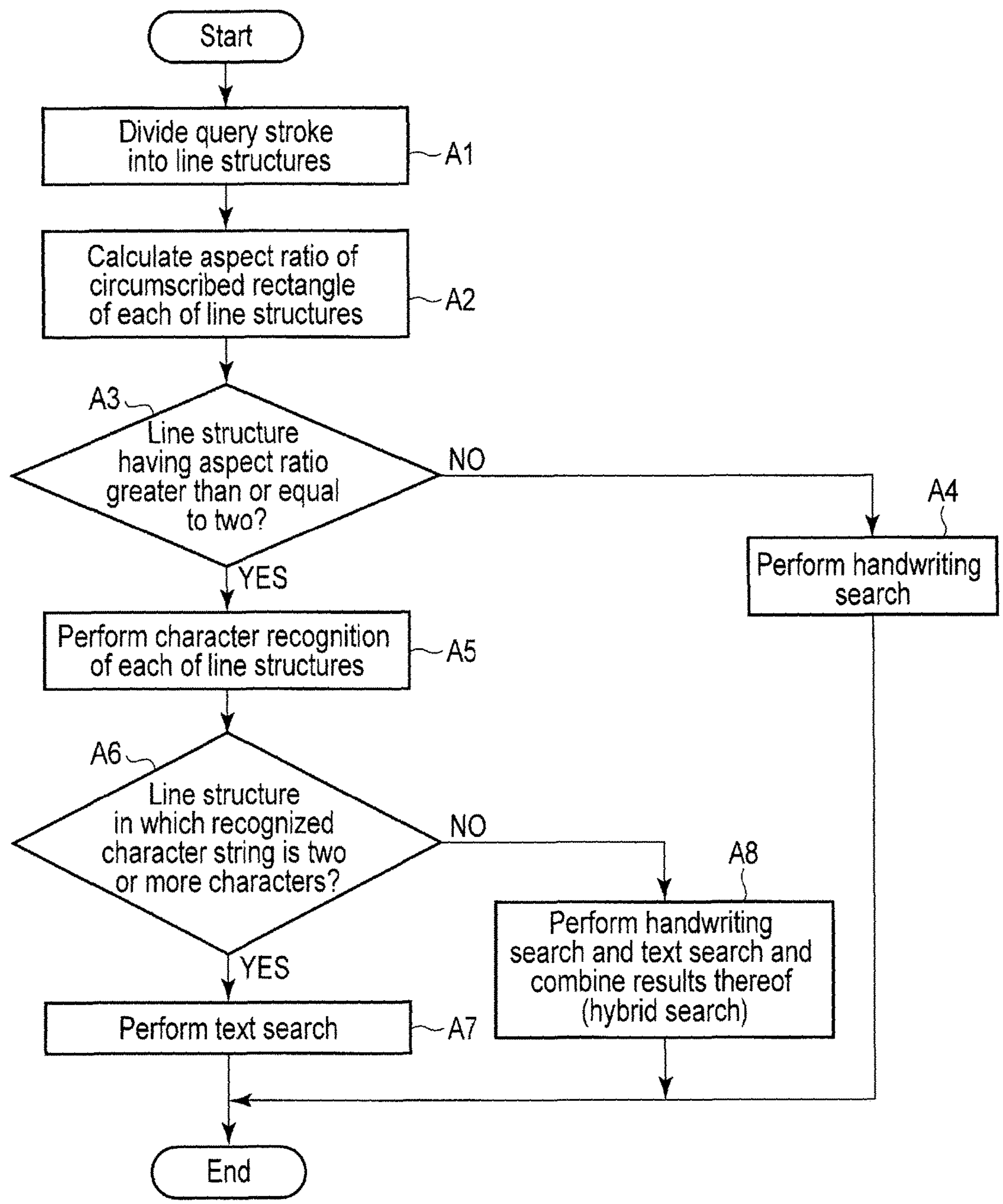
F I G. 15

ELECTRONIC DEVICE, HANDWRITTEN DOCUMENT SEARCH METHOD AND STORAGE MEDIUM

CROSS-REFERENCE TO RELATED APPLICATIONS

This application is a Continuation Application of PCT Application No. PCT/JP2013/063063, filed May 9, 2013, the entire contents of which are incorporated herein by reference.

FIELD

Embodiments described herein relate generally to an electronic device, handwritten document search method and storage medium.

BACKGROUND

In recent years, various battery-powered, portable electronic devices such as tablet terminals and smartphones have been developed. Most of these types of electronic device comprise a touchscreen display for facilitating an input operation by a user.

The user can instruct an electronic device to execute a function associated with an icon or a menu by touching the icon or the menu displayed on a touchscreen display with his or her finger or a pen (stylus).

In addition, an input operation on a touchscreen display is used not only for giving an operation instruction to an electronic device, but also for inputting a document in handwriting. Recently, users have started to attend meetings carrying these kinds of electronic device and take notes by performing handwriting input on a touchscreen display. Regarding the handwriting input on the touchscreen display, various proposals have been made so far.

However, a technique for efficiently searching for a desired handwritten document has not been conventionally considered.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing an outside of an electronic device according to an embodiment.

FIG. 2 is an exemplary diagram showing cooperative operation between the electronic device of the embodiment and an external device.

FIG. 3 is an exemplary diagram showing an example of a handwritten document handwritten on a touchscreen display of the electronic device of the embodiment.

FIG. 4 is an exemplary diagram for explaining time-series data corresponding to the handwritten document of FIG. 3, which is saved on a storage medium by the electronic device of the embodiment.

FIG. 5 is an exemplary block diagram showing a system configuration of the electronic device of the embodiment.

FIG. 7 is an exemplary diagram showing a search key input dialog displayed by the electronic device of the embodiment.

FIG. 9 is an exemplary diagram showing a data structure of a handwritten document managed by the electronic device of the embodiment.

FIG. 10 is an exemplary diagram showing feature-amount index data managed by the electronic device of the embodiment.

FIG. 11 is an exemplary diagram showing character-string index data managed by the electronic device of the embodiment.

FIG. 14 is an exemplary diagram showing an example of adaptively selecting a search method in accordance with a result of the line structure analysis of the stroke group handwritten in the search key input area of the search key input dialog.

FIG. 15 is an exemplary flowchart showing a procedure of a handwritten document search performed by the electronic device of the embodiment.

DETAILED DESCRIPTION

Figure 6:
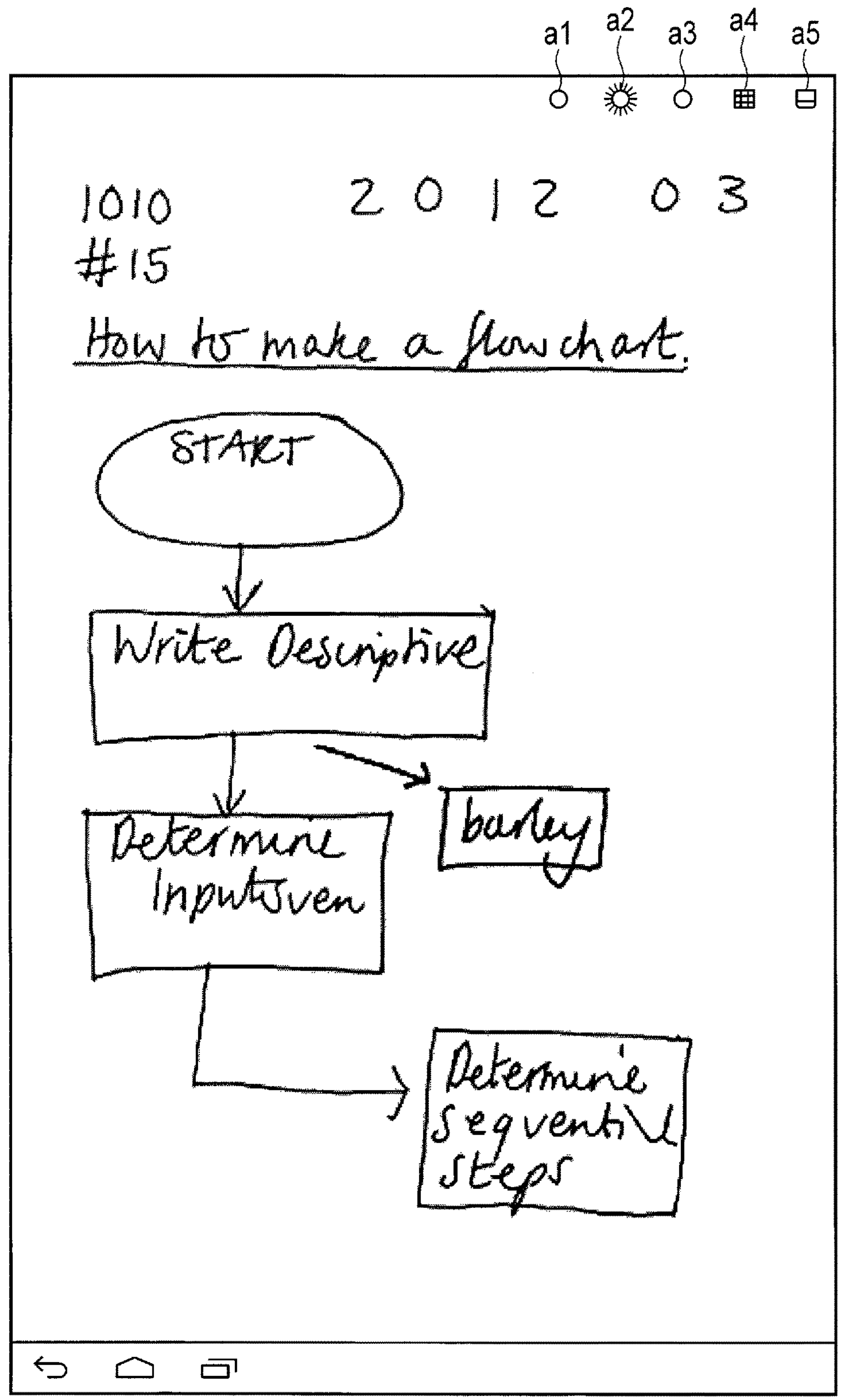
FIG. 6 is an exemplary diagram showing a notebook view screen displayed by the electronic device of the embodiment.

Various embodiments will be described hereinafter with reference to the accompanying drawings.

In general, according to one embodiment, an electronic device includes a stroke manager and a controller. The stroke manager is configured to store on a storage medium handwritten documents including stroke data items corresponding to strokes. The controller is configured to acquire a result of a search, wherein the search includes at least one of: (1) a character-string search of the handwritten documents based on code data of a character string corresponding to a first stroke group and first index data including code data of a character string corresponding to a stroke group in the handwritten documents; and (2) a handwriting stroke search of the handwritten documents, based on a feature of the first stroke group and second index data of a feature corresponding to the stroke group in the handwritten documents. The first stroke group includes a search key for performing the search and wherein the search is based on a value associated with an aspect ratio of the first stroke group.

FIG. 1 is an exemplary diagram showing an outside of an electronic device according to one embodiment. The electronic device is, for example, a pen-based portable electronic device in which handwriting input can be performed with a pen (stylus) or a finger. The electronic device can be implemented as a tablet computer, a notebook personal computer, a smartphone, a PDA, etc. In the following description, it is assumed that the electronic device is implemented as a tablet personal computer 10. The tablet computer 10 is a portable electronic device which is also called a tablet or slate computer, and comprises a main body 11 and a touchscreen display 12 as shown in FIG. 1. The touchscreen display 12 is mounted to be laid on a top surface of the main body 11.

The main body 11 comprises a housing in the shape of a thin box. The touchscreen display 12 incorporates a flat panel display and a sensor configured to detect a touch position of the pen or the finger on a screen of the flat panel display. The flat panel display is, for example, a liquid crystal display (LCD). The sensor is, for example, a capacitive touch panel or an electromagnetic induction type digitizer. In the following description, let us assume the case where both the two kinds of sensor, the digitizer and the touch panel, are incorporated in the touchscreen display 12.

The touchscreen display 12 can detect not only a touch operation on the screen with the finger but a touch operation on the screen with a pen (stylus) 100. The pen 100 is, for example, an electromagnetic induction type pen. A user can perform a handwriting input operation on the touchscreen display 12 with an external object (the pen 100 or the finger). During the handwriting input operation, a path of movement of the external object (the pen 100 or the finger) on the screen, that is, a stroke handwritten by the handwriting input operation (path of a handwritten stroke), is drawn in real time, whereby strokes input in handwriting are displayed on the screen. A path of movement of the external object made while the external object touches the screen corresponds to one stroke. Many sets of strokes corresponding to handwritten characters and handwritten objects other than characters (handwritten figures, handwritten tables, etc.) constitute a handwritten document.

In the present embodiment, the handwritten document is saved on a storage medium, not as image data, but as time-series data (handwritten document data) indicating a coordinate string of a path of each stroke and the order of strokes. The time-series data, which will be described later in detail with reference to FIG. 4, indicates the order in which strokes were handwritten, and includes stroke data items corresponding to the strokes, respectively. In other words, the time-series data means a set of time-series stroke data items corresponding to the strokes, respectively. Each stroke data item corresponds to one stroke, and includes a coordinate data series (time-series coordinates) corresponding to respective points on a path of the stroke. The order of these stroke data items corresponds to the order in which the respective strokes were handwritten.

The tablet computer 10 can read arbitrary existing time-series data from the storage medium, and display a handwritten document corresponding to the time-series data, that is, strokes indicated by the time-series data, on the screen. The strokes indicated by the time-series data are also strokes input in handwriting.

Moreover, the tablet computer 10 has an edit function. With the edit function, an arbitrary portion (a handwritten character, a handwritten mark, a handwritten figure, a handwritten table, etc.) in a displayed handwritten document, which is selected by a range selection tool, can be deleted or moved in accordance with an edit operation by the user with an eraser tool, a range selection tool, other various tools, etc. Furthermore, the arbitrary portion in the handwritten document selected by the range selection tool can also be specified as a search key for searching for the handwritten document.

In the present embodiment, a handwritten document can be managed as one or more pages. In this case, a set of time-series data within one screen may be stored as one page by dividing the time-series data (handwritten document data) by the area within the one screen. Alternatively, the size of a page may be changed. In this case, because the size of a page can be expanded to be larger in area than the size of one screen, a handwritten document larger in area than the size of the screen can be handled as one page. If the whole of one page cannot be displayed on the display at once, the page may be shrunk, or a portion to be displayed in the page may be moved by vertical and horizontal scrolling.

FIG. 2 shows an example of cooperative operation between the tablet computer 10 and an external device. The tablet computer 10 can cooperate with a personal computer 1 and a cloud. That is, the tablet computer 10 comprises a wireless communication device of a wireless LAN, etc., and can wirelessly communicate with the personal computer 1. Moreover, the tablet computer 10 can also communicate with a server 2 on the Internet. The server 2 may also be a server which performs an online storage service and other various cloud computing services.

The personal computer 1 comprises a storage device such as a hard disk drive (HDD). The tablet computer 10 can transmit time-series data (handwritten document data) to the personal computer 1 through a network, and store it on an HDD of the personal computer 1 (upload). To establish secure communication between the tablet computer 10 and the personal computer 1, the personal computer 1 may authenticate the tablet computer 10 when starting communication. In this case, a dialog prompting the user to input ID or a password may be displayed on the screen of the tablet computer 10, or ID of the tablet computer 10, etc., may be automatically transmitted from the tablet computer 10 to the personal computer 1.

The tablet computer 10 thereby can handle a lot of time-series data or large-capacitance time-series data, even if the capacity of storage in the tablet computer 10 is small.

Moreover, the tablet computer 10 can read one or more arbitrary time-series data items stored on the HDD of the personal computer 1 (download), and display strokes indicated by the read time-series data on the screen of the display 12 of the tablet computer 10. In this case, a list of thumbnails obtained by reducing respective pages of the time-series data items may be displayed on the screen of the display 12, or one page selected from these thumbnails may be displayed on the screen of the display 12 in a normal size.

Furthermore, the tablet computer 10 may communicate, not with the personal computer 1, but with the server 2 on a cloud which provides a storage service, etc., as described above. The tablet computer 10 can transmit time-series data (handwritten document data) to the server 2 through a network, and store it on a storage device 2A of the server 2 (upload). Moreover, the tablet computer 10 can read arbitrary time-series data stored in the storage device 2A of the server 2 (download), and display respective paths of strokes indicated by the time-series data on the screen of the display 12 of the tablet computer 10.

In this manner, in the present embodiment, the storage medium on which time-series data is saved may be any of a storage device in the tablet computer 10, the storage device in the personal computer 1, and the storage device in the server 2.

Next, a relationship between a stroke (character, figure, table, etc.) handwritten by the user and time-series data will be described with reference to FIG. 3 and FIG. 4. FIG. 3 shows an example of a handwritten document (handwritten character string) handwritten on the touchscreen display 12 with the pen 100 or the like.

In a handwritten document, a case often occurs where after a character, a figure, or the like is input by hand, another character, figure, or the like is further input thereon by hand. In FIG. 3, the case where a handwritten character string "ABC" is input by hand in the order of "A", "B" and "C", and then, a handwritten arrow is input by hand close to the handwritten character "A" is assumed.

The handwritten character "A" is represented by two strokes (a path in the shape of "∧" and a path in the shape of "-") handwritten with the pen 100 or the like, that is, two paths. The path "∧" of the pen 100 which is first handwritten is sampled in real time, for example, at regular time intervals, whereby time-series coordinates SD11, SD12, . . . , SD1*n* of the stroke "∧" are obtained. Similarly, the path "-" of the pen 100 which is handwritten next is also sampled in real time at regular time intervals, whereby time-series coordinates SD21, SD22, . . . , SD2*n* of the stroke "-" are obtained.

The handwritten character "B" is represented by two strokes handwritten with the pen 100 or the like, that is, two paths. The handwritten character "C" is represented by one stroke handwritten with the pen 100 or the like, that is, one path. The handwritten arrow is represented by two strokes handwritten with the pen 100 or the like, that is, two paths.

FIG. 4 shows time-series data 200 corresponding to the handwritten document of FIG. 3. The time-series data includes stroke data items SD1, SD2, . . . , SD7. In the time-series data 200, the stroke data items SD1, SD2, . . . , SD7 are chronologically arranged in the order in which strokes were handwritten.

In the time-series data 200, the first and second stroke data items SD1 and SD2 represent the two strokes of the handwritten character "A", respectively. The third and fourth stroke data items SD3 and SD4 represent the two strokes constituting the handwritten character "B", respectively. The fifth stroke data item SD5 represents the one stroke constituting the handwritten character "C". The sixth and seventh stroke data items SD6 and SD7 represent the two strokes constituting the handwritten arrow, respectively.

Each stroke data item includes a coordinate data series (time-series coordinates) corresponding to one stroke, that is, coordinates corresponding to respective points on a path of one stroke. In each stroke data item, the coordinates are chronologically arranged in the order in which strokes were written. For example, regarding the handwritten character "A", the stroke data item SD1 includes a coordinate data series (time-series coordinates) corresponding to respective points on the path of the stroke "A" of the handwritten character "A", that is, the n coordinate data items SD11, SD12, . . . , SD1*n*. The stroke data item SD2 includes a coordinate data series corresponding to respective points on the path of the stroke "-" of the handwritten character "A", that is, the n coordinate data items SD21, SD22, . . . , SD2*n*. The number of coordinate data items may vary from stroke data item to stroke data item.

Each coordinate data item indicates x- and y-coordinates corresponding to a certain point on a corresponding path. For example, the coordinate data item SD11 indicates an x-coordinate (X11) and a y-coordinate (Y11) of a start point of the stroke "∧". The coordinate data item SD1*n* indicates an x-coordinate (X1*n*) and a y-coordinate (Yin) of an end point of the stroke "∧".

Furthermore, each coordinate data item may include timestamp data T corresponding to a point in time when a point corresponding to coordinates was handwritten. The point in time when the point was handwritten may be an absolute time (for example, year, month, day, hour, minute, and second) or a relative time determined with respect to a certain point in time. For example, an absolute time (for example, year, month, day, hour, minute, and second) when a stroke started being written may be added to each stroke data item as timestamp data, and a relative time indicating a difference from the absolute time may be further added to each coordinate data item in stroke data as timestamp data T.

In this manner, a temporal relationship between strokes can be more accurately indicated by using time-series data including timestamp data T added to each coordinate data item.

Moreover, data (Z) indicating writing pressure may be added to each coordinate data item.

The time-series data 200 having such a structure as described with reference to FIG. 4 can indicate not only handwriting of individual strokes but a temporal relationship between the strokes. Therefore, by using the time-series data 200, the handwritten character "A" and a tip portion of the handwritten arrow can be handled as different characters or figures, even if the tip portion of the handwritten arrow is written to be superposed on the handwritten character "A" or close to the handwritten character "A" as shown in FIG. 3.

Furthermore, in the present embodiment, since handwritten document data is stored not as an image or a character recognition result but as the time-series data 200 comprising a set of time-series stroke data as described above, handwritten characters can be handled without depending on the language of the handwritten characters. Therefore, the structure of the time-series data 200 of the present embodiment can be commonly used in various countries around the world where different languages are used.

FIG. 5 is an exemplary diagram showing a system configuration of the tablet computer 10.

As shown in FIG. 5, the tablet computer 10 comprises a CPU 101, a system controller 102, a main memory 103, a graphics controller 104, a BIOS-ROM 105, a nonvolatile memory 106, a wireless communication device 107, an embedded controller (EC) 108, etc.

The CPU 101 is a processor which controls operation of various modules in the tablet computer 10. The CPU 101 executes various items of software loaded from the nonvolatile memory 106, which is a storage device, into the main memory 103. These items of software include an operating system (OS) 201 and various application programs. The application programs include a handwritten notebook application program 202. The handwritten notebook application program 202 has a function of generating and displaying the above-described handwritten page data, a function of editing the handwritten page data, and a handwritten document search function for searching for handwritten document data including a desired handwritten portion and a desired handwritten portion in handwritten document data.

In addition, the CPU 101 also executes a Basic Input/Output System (BIOS) stored in the BIOS-ROM 105. The BIOS is a program for hardware control.

The system controller 102 is a device which connects a local bus of the CPU 101 and various components. The system controller 102 also contains a memory controller which exerts access control over the main memory 103. In addition, the system controller 102 also has a function of communicating with the graphics controller 104 through a serial bus conforming to the PCI EXPRESS standard, etc.

The graphics controller 104 is a display controller which controls an LCD 12A used as a display monitor of the tablet computer 10. A display signal generated by the graphics controller 104 is transmitted to the LCD 12A. The LCD 12A displays a screen image on the basis of the display signal. A touch panel 12B and a digitizer 12C are disposed on the LCD 12A. The touch panel 12B is a capacitive pointing device for performing input on a screen of the LCD 12A. A touch position on the screen which the finger touches, the movement of the touch position, etc., are detected by the touch panel 12B. The digitizer 12C is an electromagnetic induction type pointing device for performing input on the screen of the LCD 12A. A touch position on the screen which the pen 100 touches, the movement of the touch position, etc., are detected by the digitizer 12C.

The wireless communication device 107 is a device configured to perform wireless communication such as wireless LAN or 3G mobile communication. The EC 108 is a single-chip microcomputer including an embedded controller for power management. The EC 108 has a function of powering on or off the tablet computer 10 in accordance with the user's operation of a power button.

FIG. 6 shows a notebook view screen which is a representative screen presented to the user by the handwritten notebook application program 202.

The notebook view screen is a screen on which a page (handwritten page) can be newly generated and an existing page can be viewed and edited. On the notebook view screen, a black pen button a1, a red pen button a2, a highlighter button a3, a selection button a4, and an eraser button a5 are displayed.

For example, when a handwriting input operation is performed on the notebook view screen with the pen 100 in the state where the black pen button a1 is selected by a tap gesture, the handwritten notebook application program 202 displays a black stroke (path) on the notebook view screen in accordance with the movement of the pen 100.

FIG. 7 shows an example of a search key input dialog. For example, in response to detection of a tap gesture on the touchscreen display 12, the handwritten notebook application program 202 displays the search key input dialog including a search key input area b1 and a search button b2 on the screen. The search key input area b1 is an input area for handwriting a character string, a figure, a table, etc., to be a search key. The search button b2 is a button for requesting execution of a search process. The user can handwrite not only a handwritten character string, but also a handwritten figure, a handwritten table, etc., in the search key input area b1.

Figure 8:
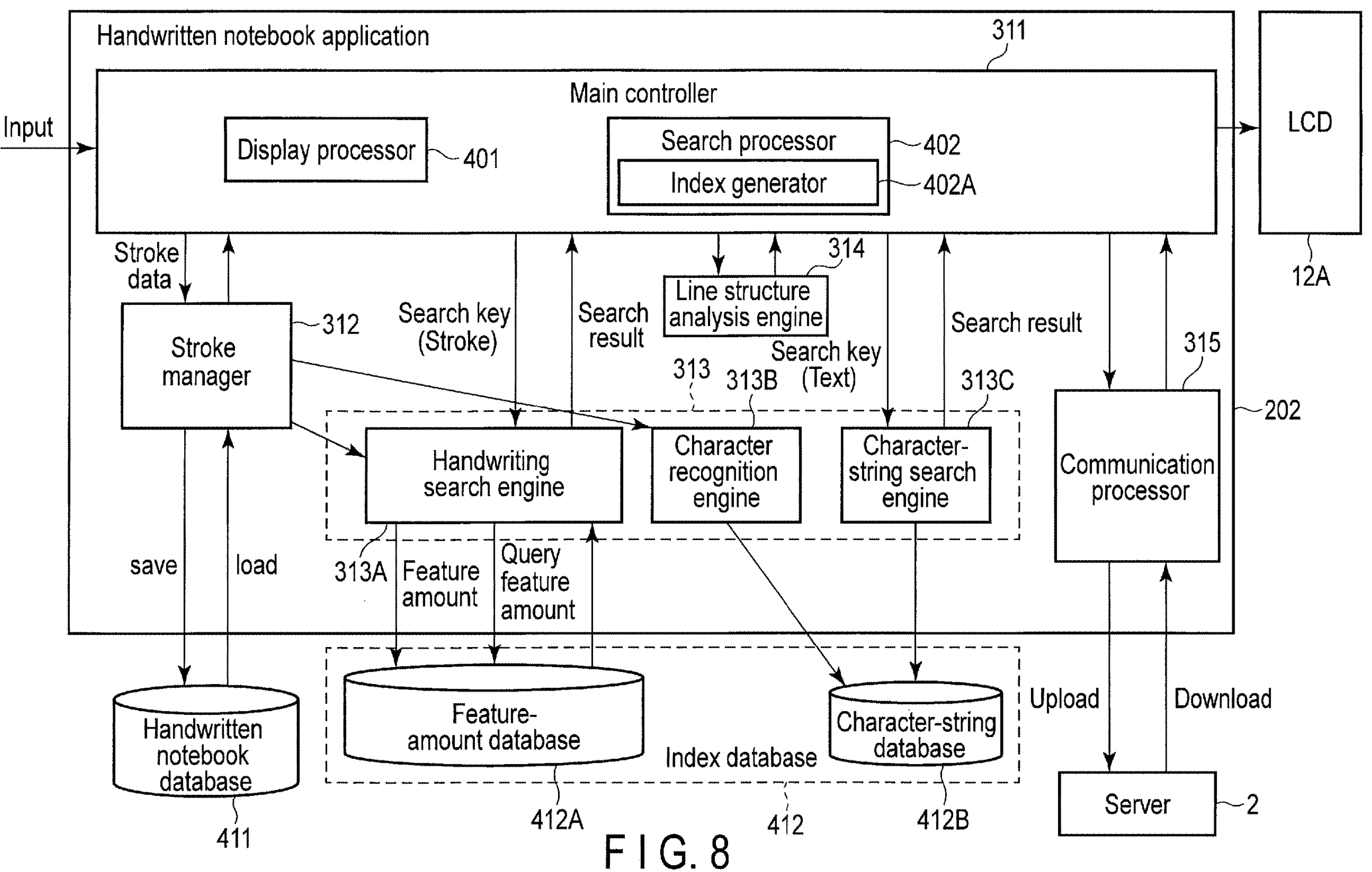
FIG. 8 is an exemplary block diagram showing a functional configuration of a handwritten notebook application program executed by the electronic device of the embodiment.

Next, a functional configuration of the handwritten notebook application program 202 will be described with reference to FIG. 8.

The handwritten notebook application program 202 is a WYSIWYG application in which handwritten document data can be handled, and comprises a main controller 311, a stroke manager 312, a search engine 313, a line structure analysis engine 314, a communication processor 315, etc. The main controller 311 performs, generation, display, edit, etc., of a handwritten document (handwritten page) by using stroke data input on the touchscreen display 12.

The main controller 311 comprises a display processor 401 and a search processor 402. The display processor 401 displays strokes input in handwriting on the screen of the LCD 12A in the touchscreen display 12. For example, with the notebook view screen of FIG. 6 displayed, the display processor 401 draws a stroke on the notebook view screen on the basis of a coordinate string input from the digitizer 12C. The search processor 402 performs the above-described handwritten document search in cooperation with the search engine 313. The search processor 402 comprises an index generator 402A. The index generator 402A generates index data for searching for each handwritten page in cooperation with the search engine 313.

The main controller 311 receives a coordinate string corresponding to a path of movement of the pen 100 from the touchscreen display 12 (for example, the digitizer 12C). The display processor 401 displays each stroke corresponding to a handwritten character, a handwritten figure, etc., written by a handwriting input operation on the screen of the LCD 12A in the touchscreen display 12 on the basis of the coordinate string. By the display processor 401, a path of the pen 100 made while the pen 100 touches the screen, that is, a path of each stroke, is drawn on the screen of the LCD 12A. The main controller 311 transmits the above-described coordinate string received from the touchscreen display 12 to the stroke manager 312.

The stroke manager 312 functions as a save module configured to save a handwritten document (handwritten page) including stroke data items corresponding to strokes on a handwritten notebook database 411. More specifically, the stroke manager 312 generates the above-described time-series data having such a structure as described in detail with reference to FIG. 4 on the basis of the above-described coordinate string received from the touchscreen display 12, and saves the time-series data on the handwritten notebook database 411 as a page of a handwritten notebook. The handwritten notebook database 411 is one storage area in the storage medium. Moreover, the stroke manager 312 reads a page of an arbitrary handwritten notebook from the handwritten notebook database 411. Time-series data corresponding to the read page is transmitted to the display processor 401. The display processor 401 analyzes the time-series data, and displays each stroke indicated by the time-series data (each stroke input in handwriting) on the screen on the basis of a result of the analysis.

As described above, a handwritten document search is performed by the search processor 402 and the search engine 313. The search processor 402 can search the handwritten notebook database 411, using two types of search method of a handwriting search and a character-string search (text search).

The search engine 313 comprises a handwriting search engine 313A, a character recognition engine 313B, and a character-string search engine 313C. The handwriting search engine 313A performs the above-described handwriting search under the control of the search processor 402. This handwriting search is a search method for searching for a handwritten document including a handwritten portion having a feature amount (handwriting feature) similar to a feature amount (handwriting feature) of strokes which are a search key.

As a feature amount (handwriting feature) of strokes, arbitrary data which can represent a feature of each stroke can be used. For example, as a feature amount (handwriting feature) of strokes, feature amount data indicating the shape, the handwriting direction, the inclination, etc., of each stroke can be used. If a handwriting search is performed, the handwriting search engine 313A receives strokes which are a search key from the search processor 402. Then, the handwriting search engine 313A searches for one or more handwritten documents (handwritten pages) including an area (handwritten portion) corresponding to the above search key, using feature-amount index data for searching areas in handwritten documents (handwritten pages) and a feature amount of the strokes which are the search key (query feature amount). The feature-amount index data includes a feature amount of a stroke group in an area.

More specifically, the handwriting search engine 313A finds a feature-amount index data portion having a feature amount similar to a query feature amount from the feature-amount index data in a feature-amount database 412A, and returns the feature-amount index data portion to the main controller 311. In this case, a feature-amount index data portion whose similarity to the query feature amount is greater than or equal to a reference value is acquired from the feature-amount index data. As a method for calculating this similarity, dynamic programming (DP) matching may also be used.

The search processor 402 of the main controller 311 searches for one or more handwritten pages including a handwritten portion having a feature amount similar to the above-described query feature amount on the basis of the feature-amount index data portion received from the handwriting search engine 313A.

In addition, the handwriting search engine 313A is configured to execute also a process of generating the above-described index data corresponding to each handwritten page under the control of the index generator 402A. Feature amount index data on a handwritten page may be generated when the handwritten page is saved. In this case, stroke data items corresponding to the handwritten page are saved on the handwritten notebook database 411, and are transmitted to the handwriting search engine 313A. The handwriting search engine 313A analyzes stroke data on each area (each handwritten portion) in the handwritten page, and generates the above-described feature-amount index data. The generated feature-amount index data is stored in the feature-amount database 412A, being associated with a corresponding handwritten page in the handwritten notebook database 411.

The character-string search is a search method (text search) for searching for a handwritten document including a character string corresponding to strokes which are a search key. In the character-string search (text search), the character-string search engine 313C receives code data (text) on a character string corresponding to strokes from the search processor 402 as a search key (search term). The code data on the character string corresponding to the strokes can be acquired by performing character recognition of the strokes by the character recognition engine 313B. In addition, the character-string search engine 313C searches for a handwritten page including a handwritten portion corresponding to the above search key (search term), using character-string index data for searching areas in handwritten documents (handwritten pages) and the code data (text) on the character string corresponding to the strokes which are the search key. The character-string index data includes code data on a character string corresponding to a stroke group included in the areas in the handwritten pages. The code data can be generated by, for example, performing character recognition of a stroke group of each handwritten character string.

In the process of the character-string search, the character-string search engine 313C finds a character-string index data portion including the above search term from character-string index data in a character-string search database 412B. Then, the character-string search engine 313C returns the character-string index data portion to the main controller 311. The search processor 402 of the main controller 311 can search for one or more handwritten pages including a handwritten portion corresponding to the above search term on the basis of the character-string index data portion received from the character-string search engine 313C.

Incidentally, the handwriting search can be performed, using a query stroke which is not a character, such as a picture or a mark. However, since it depends on a style of writing or a habit of the user, it is hard to get hits for strokes made by other users in the search.

On the other hand, since the character-string search (text search) is performed, using code data acquired by the character recognition engine 313B, it is easy to get hits for strokes made by other users in the search. However, the character recognition engine 313B returns code data on a character string of any strokes. Thus, if strokes input as a search key are not characters but something like a picture, the search is performed by a character string which the user does not intend and the accuracy of the search declines.

Therefore, in the present embodiment, a handwritten document search is performed by using both the handwriting search and the character-string search (text search). In the present embodiment, any of the handwriting search, the character-string search (text search), and a hybrid search of the handwriting search and the character-string search (text search) is adaptively selected. This point will be described hereinafter in detail.

The index generator 402A of the search processor 402 generates character-string index data for performing a character-string search (text search) of handwritten pages and feature-amount index data for performing a handwriting search of handwritten pages. The character-string index data includes code data on a character string corresponding to a stroke group. The feature-amount index data indicates a feature amount of a stroke group.

The code data on the character string can be acquired by performing character recognition of a stroke group by the character recognition engine 313B. The generated character-string index data is stored in the character-string search database 412B in an index database 412. On the other hand, the feature-amount index data is data indicating a feature amount (handwriting feature) of a stroke group in an area. The generated feature-amount index data is stored in the feature-amount database 412A in the index database 412.

Moreover, the main controller 311 can communicate with the server 2 through the communication processor 315. The communication processor 315 functions as a transmitter which transmits (uploads) arbitrary handwritten page data to the server 2, and further functions as a receiver which receives arbitrary handwritten page data from the server 2. A function of the line structure analysis engine 314 will be described later.

FIG. 9 shows a structure of a handwritten page data management table stored in the handwritten notebook database 411. The handwritten page data management table includes entries corresponding to handwritten pages. Each of the entries includes, for example, page ID, user ID, stroke ID, and stroke data. In an entry corresponding to handwritten page data, "page ID" indicates identification data added to the handwritten page data. "User ID" indicates identification data added to a user who generated the handwritten page data. "Stroke ID" indicates identification data added to a stroke handwritten in the handwritten page data. "Stroke data" indicates a coordinate data series (time-series coordinates) corresponding to a stroke handwritten in the handwritten page data.

FIG. 10 shows a structure example of a feature-amount index data management table stored in the feature-amount database 412A. The feature-amount index data management table includes entries corresponding to strokes. Each of the entries includes, for example, page ID, stroke ID, and a feature amount. In an entry corresponding to a stroke, "page ID" indicates identification data added to a handwritten document in which the stroke is handwritten. "Stroke ID" indicates identification data added to the stroke. "Feature amount" indicates a feature amount (handwriting feature) calculated by analyzing the stroke. As a handwriting feature, feature-amount data indicating the shape, etc., of each stroke can be used as described above.

The case in which a feature amount is managed for each stroke has been herein described as an example. However, a feature amount may be managed for each handwritten object (handwritten block) such as a handwritten figure, a handwritten table, and a handwritten sign. As a feature amount of a handwritten object, an arbitrary feature amount which can represent a feature such as the shape, etc., of the handwritten object can be used. Moreover, the feature amount of the handwritten object may include data indicating the order in which strokes constituting the handwritten object were written, etc.

In addition, the feature-amount index data management table may include data indicating a position in a page where each handwritten object exists.

FIG. 11 shows a structure example of a character-string index data management table stored in the character-string search database 412B. The character-string index data management table includes entries corresponding to strokes. Each of the entries includes, for example, "page ID", "stroke ID range", and "character string". In an entry corresponding to a character-string block, "page ID" indicates identification data on a handwritten page in which the character-string block is handwritten. "Stroke ID range" indicates a range of identification data added to a stroke group in the character-string block. "Character string" indicates code data (character code group) on the character-string block. In code data (character code group) on a character-string block, code data items corresponding to respective character-string candidates of the character-string block may be registered. In addition, the character-string index data management table may include data indicating a position in a page where each character-string block exists.

An outline of a handwritten document search will be described herein with reference to FIG. 12, FIG. 13 and FIG. 14.

Figure 12:
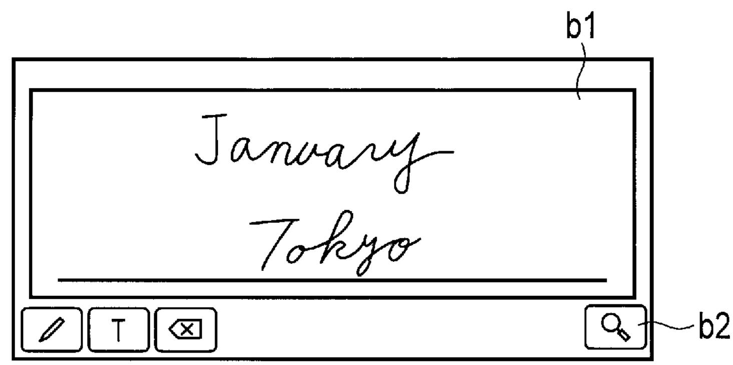
FIG. 12 is an exemplary diagram showing an example in which a stroke group is handwritten as a search key in a search key input area of the search key input dialog.
Figure 13:
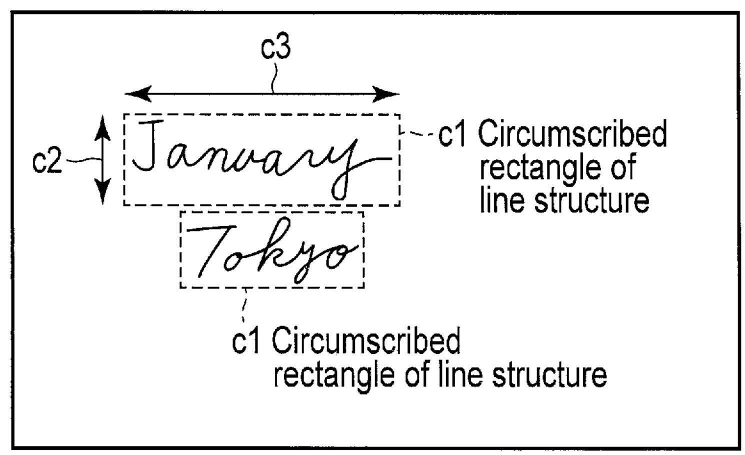
FIG. 13 is an exemplary diagram for explaining a line structure analysis of the stroke group handwritten in the search key input area of the search key input dialog.

Let us now assume, for example, the case where strokes corresponding to "January" and "Tokyo" are handwritten with the pen 100 in the search key input area b1 of the search key input dialog displayed by a tap gesture on the touchscreen display 12 as shown in FIG. 12.

When a search key (query strokes) is handwritten in the search key input area b1 of the search key input dialog, the search processor 402 first divides the stroke group into line structures by the line structure analysis engine 314, and acquires an aspect ratio of each of the line structures. The line structure analysis engine 314 is a module which performs an analysis of line structures for a stroke group. As shown in FIG. 13, the line structure analysis engine 314 divides a stroke group given from the search processor 402 into two line structures of "January" and "Tokyo". In addition, the line structure analysis engine 314 virtually sets a rectangle (c1 of FIG. 13) which circumscribes the stroke group for each of the divided line structures, determines the length of a longitudinal side (c2 of FIG. 13) and the length of a lateral side (c3 of FIG. 13) of the rectangle, and calculates an aspect ratio of the rectangle. The line structure analysis engine 314 returns the calculated aspect ratio of each of the line structures to the search processor 402.

The search processor 402 adaptively selects any of a handwriting search, a character-string search (text search), and a hybrid search of the handwriting search and the character-string search (text search) in accordance with the aspect ratio of each of the line structures returned from the line structure analysis engine 314.

More specifically, the search processor 402 basically determines a stroke group as a character string and selects a character-string search (text search), if there is a line structure having an aspect ratio greater than or equal to a threshold value (for example, the length of a lateral side being greater than or equal to twice the length of a longitudinal side); and determines the stroke group as a noncharacter string such as a figure and selects a handwriting search, if there is no line structure having an aspect ratio greater than or equal to the threshold value.

As shown in FIG. 14, if a character string is handwritten as a search key ((A) of FIG. 14), it is highly probable that an aspect ratio of strokes is greater than or equal to a threshold value. Thus, the search processor 402 efficiently selects a handwriting search or a character-string search (text search) on the basis of the fact that if an aspect ratio of strokes is less than a threshold value, it is highly probable that a noncharacter string such as a figure is handwritten as a search key ((B) of FIG. 14).

If there is a line structure having an aspect ratio greater than or equal to a threshold value, the search processor 402 acquires code data corresponding to each stroke divided into line structures by the character recognition engine 313B, to perform a character-string search (text search).

If there is a line structure in which the number of characters whose code data has been acquired is greater than or equal to a threshold value (for example, greater than or equal to two), the search processor 402 determines selection of a character-string search (text search). On the other hand, if there is no line structure in which the number of characters whose code data has been acquired is greater than or equal to a threshold value, the search processor 402 adds a handwriting search, and selects a hybrid search of the handwriting search and the character-string search (text search).

FIG. 15 is an exemplary flowchart showing a procedure of a handwritten document search performed by the tablet computer 10.

The search processor 402 divides a stroke group (query strokes) of a search key handwritten in the search key input area b1 of the search key input dialog into line structures by the line structure analysis engine 314 (block A1). The line structure analysis engine 314 divides the query strokes into line structures, and calculates an aspect ratio of a circumscribed rectangle of each of the line structures (block A2).

The search processor 402 examines whether or not there is a line structure having an aspect ratio, calculated by the line structure analysis engine 314, greater than or equal to a threshold value (for example, the length of a lateral side being greater than or equal to twice the length of a longitudinal side) (block A3), and if not (NO in block A3), performs a handwriting search in cooperation with the search engine 313 (block A4).

On the other hand, if there is a line structure having an aspect ratio greater than or equal to the threshold value (YES in block A3), the search processor 402 performs character recognition of each of the line structures by the character recognition engine 313B (block A5). The search processor 402 determines whether or not there is a line structure in which the number of characters whose code data has been acquired by the character recognition engine 313B is greater than or equal to a threshold value (for example, greater than or equal to two), that is, whether or not there is a line structure in which a recognized character string is two or more characters (block A6), and if so (YES in block A6), performs a character-string search (text search) in cooperation with the search engine 313 (block A7).

Further, if there is no line structure in which a recognized character string is two or more characters (although there is a line structure having an aspect ratio greater than or equal to a threshold value) (NO in block A6), the search processor 402 performs a hybrid search of a handwriting search and a character-string search (text search) in cooperation with the search engine 313 (block A8). More specifically, the handwriting search and the character-string search (text search) are performed, and results thereof are combined.

As described above, the tablet computer 10 achieves an efficient search of a handwritten document by an original technique of switching a search method in accordance with an aspect ratio of a query stroke string and the number of code data items (the number of characters) obtained by performing character recognition of the query stroke string.

Incidentally, although the example of handwriting a query stroke string in the search key input area b1 of the search key input dialog has been given in the above description, the query stroke string is not limited to this, and for example, may be selected from an existing handwritten page (including strokes) displayed on the notebook view screen.

In addition, although the example of selecting a search method for a query stroke string as a whole has been given in the above description, a search method may be selected for each line structure after division.

Because various processes of the present embodiment can be implemented by a computer program, the same advantages as those of the present embodiment can be easily achieved by installing the computer program in a normal computer through a computer-readable storage medium storing the computer program and executing the computer program.

In addition, some of the various processes of the present embodiment may be executed by the server 2.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:

a processor, and a memory, wherein the processor is configured to:

store on a storage medium handwritten documents comprising stroke data items corresponding to strokes;

divide first strokes into line structures, the first strokes corresponding to a search key for searching for stroke data items in the handwritten documents;

virtually set a rectangle which circumscribes the first strokes for each of the line structures;

determine a length of a first direction side of the rectangle and a length of a second direction side of the rectangle;

perform a character-string search when there is a line structure in which the first direction side of the rectangle is greater than or equal to a first threshold value obtained based on the second direction side of the rectangle; and perform a noncharacter-string search when there is no line structure in which the first direction side of the rectangle is greater than or equal to the first threshold value.

2. The device of claim 1, wherein the first strokes comprise handwritten strokes received in a search key input area on a screen.

3. The device of claim 1, wherein the first strokes comprise strokes selected from a handwritten document displayed on a screen.

4. A handwritten document search method comprising:

storing on a storage medium handwritten documents comprising stroke data items corresponding to strokes;

dividing first strokes into line structures the first strokes corresponding to a search key for searching for stroke data items in the handwritten documents;

virtually setting a rectangle which circumscribes the first strokes for each of the line structures;

determining a length of a first direction side of the rectangle and a length of a second direction side of the rectangle;

performing a character-string search using a character-string searcher when there is a line structure in which the first direction side of the rectangle is greater than or equal to a first threshold value obtained based on the second direction side of the rectangle; and performing a noncharacter-string search using a handwriting searcher when there is no line structure in which the first direction side of the rectangle is greater than or equal to the first threshold value.

5. The method of claim 4, wherein the first strokes comprise handwritten strokes received in a search key input area on a screen.

6. The method of claim 4, wherein the first strokes comprise strokes selected from a handwritten document displayed on a screen.

7. A non-transitory computer-readable storage medium having stored thereon a computer program which is executable by a computer, the computer program controlling the computer to execute functions of:

storing on a storage medium handwritten documents comprising stroke data items corresponding to strokes;

dividing first strokes into line structures, the first strokes corresponding to a search key for searching for stroke data items in the handwritten documents;

virtually setting a rectangle which circumscribes the first strokes for each of the line structures;

determining a length of a first direction side of the rectangle and a length of a second direction side of the rectangle;

performing a character-string search using a character-string searcher when there is a line structure in which the first direction side of the rectangle is greater than or equal to a first threshold value obtained based on the second direction side of the rectangle; and performing a noncharacter-string search using a handwriting searcher when there is no line structure in which the first direction side of the rectangle is greater than or equal to the first threshold value.

8. The device of claim 1, wherein the controller is configured to:

calculate an aspect ratio of the rectangle;

perform the character-string search using the character-string searcher when the aspect ratio is greater than or equal to two or when the aspect ratio is less than or equal to one-half; and perform the noncharacter-string search using the handwriting searcher when the aspect ratio is not greater than or equal to two and when the aspect ratio is not less than or equal to one-half.

9. The device of claim 1, wherein the controller is configured to determine selection of the character-string search using the character-string searcher when there is a line structure in which a number of characters whose code data has been acquired by character recognition is greater than or equal to a second threshold value.

10. The device of claim 1, wherein the controller is configured to determine selection of a hybrid search of the character-string search using the character-string searcher and the noncharacter-string search using the handwriting searcher when there is no line structure in which a number of characters whose code data has been acquired by character recognition is greater than or equal to a second threshold value.

11. The device of claim 1, wherein the controller is configured to:

determine selection of the character-string search using the character-string searcher when there is a line structure in which a number of characters whose code data has been acquired by character recognition is greater than or equal to two; and determine selection of a hybrid search of the character-string search using the character-string searcher and the noncharacter-string search using the handwriting searcher when there is no line structure in which a number of characters whose code data has been acquired by character recognition is greater than or equal to two.

12. The method of claim 4, further comprising:

calculating an aspect ratio of the rectangle;

performing the character-string search using the character-string searcher when the aspect ratio is greater than or equal to two or when the aspect ratio is less than or equal to one-half; and performing the noncharacter-string search using the handwriting searcher when the aspect ratio is not greater than or equal to two and when the aspect ratio is not less than or equal to one-half.

13. The method of claim 4, further comprising determining selection of the character-string search using the character-string searcher when there is a line structure in which a number of characters whose code data has been acquired by character recognition is greater than or equal to a second threshold value.

14. The method of claim 4, further comprising determining selection of a hybrid search of the character-string search using the character-string searcher and the noncharacter-string search using the handwriting searcher when there is no line structure in which a number of characters whose code data has been acquired by character recognition is greater than or equal to a second threshold value.

15. The method of claim 4, further comprising:

determining selection of the character-string search using the character-string searcher when there is a line structure in which a number of characters whose code data has been acquired by character recognition is greater than or equal to two; and determining selection of a hybrid search of the character-string search using the character-string searcher and the noncharacter-string search using the handwriting searcher when there is no line structure in which a number of characters whose code data has been acquired by character recognition is greater than or equal to two.

16. The medium of claim 7, wherein the computer program further controls the computer to execute functions of:

calculating an aspect ratio of the rectangle;

performing the character-string search using the character-string searcher when the aspect ratio is greater than or equal to two or when the aspect ratio is less than or equal to one-half; and performing the noncharacter-string search using the handwriting searcher when the aspect ratio is not greater than or equal to two and when the aspect ratio is not less than or equal to one-half.

17. The medium of claim 7, wherein the computer program further controls the computer to execute functions of determining selection of the character-string search using the character-string searcher when there is a line structure in which a number of characters whose code data has been acquired by character recognition is greater than or equal to a second threshold value.

18. The medium of claim 7, wherein the computer program further controls the computer to execute functions of determining selection of a hybrid search of the character-string search using the character-string searcher and the noncharacter-string search using the handwriting searcher when there is no line structure in which a number of characters whose code data has been acquired by character recognition is greater than or equal to a second threshold value.

19. The medium of claim 7, wherein the computer program further controls the computer to execute functions of:

determining selection of the character-string search using the character-string searcher when there is a line structure in which a number of characters whose code data has been acquired by character recognition is greater than or equal to two; and determining selection of a hybrid search of the character-string search using the character-string searcher and the noncharacter-string search using the handwriting searcher when there is no line structure in which a number of characters whose code data has been acquired by character recognition is greater than or equal to two.

* * * * *